United States Patent Office 3,519,653
Patented July 7, 1970

3,519,653
EPOXY RESIN INTERMEDIATES DERIVED FROM BARK
Wilhelm N. Martin, 880 14th Ave.,
Grand'Mere, Quebec, Canada
No Drawing. Continuation-in-part of application Ser. No. 561,712, June 30, 1966. This application Apr. 16, 1969, Ser. No. 816,793
Int. Cl. C07d 1/02
U.S. Cl. 260—348
6 Claims

ABSTRACT OF THE DISCLOSURE

The invention relates to the preparation of epoxy resin intermediates by adding an alkali metal hydroxide to a mixture of dihydroxy phenols obtained from coniferous tree bark to convert the phenols into the alkali metal salts thereof. The salts are dried to a moisture content of 0.86% to 5%, and suspended in a quantity of epichlorohydrin in excess of the stoichiometric amount required for reaction thereof with the alkali metal present. The resulting mixture is heated to cause reaction of the salts and epichlorohydrin. The glycidyl ether constituting the resin intermediate is recovered from the reaction mixture.

This application is a continuation-in-part of Ser. No. 561,712, filed June 30, 1966 and now abandoned.

Commercial epoxy resins are usually made by reacting a dihydroxy phenol with epichlorohydrin in aqueous caustic solution. There are a large number of dihydroxy phenols which may be used for this purpose and the following are given by way of example: resorcinol, catechol, bis-(4-hydroxyphenyl)-2-2-propane, 4,4-dihydroxy benzophenone, bis-(4-hydroxyphenyl)-1,1-ethane, bis-(4-hydroxyphenyl) methane, 1,1-bis-(4-hydroxyphenyl) isobutane, 2,2-bis-(4-hydroxyphenyl)butane, 4,4-dihydroxy-didiphenol, 1,1-bis-(4-hydroxyphenyl) ethane.

Outstanding properties of epoxy resins are excellent adhesion, superior chemical resistance, and extra-ordinary flexibility. However, while these resins show promise of becoming quite important commercially, the starting materials are sufficiently expensive to prevent large scale use of them. Such uses would include the coating of roads, steel and concrete surfaces.

The present invention proposes to provide a method of producing glycidyl ethers of phenolic compounds constituting the epoxy resin intermediates using inexpensive starting materials comprising tree bark extracts or pyrolysates containing dihydroxy phenols.

The final resin is produced from the intermediates of the present invention by curing in conventional manner, such as by the use of amines, anhydrides or by condensation. The so-called "cold" cures may be employed. Moreover, conventional modifiers, stabilizers and fillers may be added if desired.

It will be appreciated that manufacturers of wood pulp are faced with the problem of having to dispose of large quantities of tree bark and numerous attempts have been made to put this waste material to profitable use.

There are various ways of treating bark to recover the desired phenolic type resin-reactive materials therefrom. Bark contains phenolic or aldehyde-reactive materials and it is well known that an alkaline extraction of bark will yield a derivative containing a mixture of aliphatic and aromatic chemicals, the aromatic portion of which consists mainly of a mixture of phenolic compounds. One example of alkaline extraction of phenolic compound containing materials from bark is described in copending application Ser. No. 563,090, filed July 6, 1966.

The treatment set forth in such application comprises heating a bark material containing aldehyde-reactive material and aldehyde-unreactive material, part of aldehyde-unreactive material being in the form of high molecular weight polysaccharide-type of material and part of said aldehyde-reactive material being combined molecularly with aldehyde-unreactive material, in an alkaline medium at a temperature and time sufficient to essentially liberate in solution in a molecular sense, the said aldehyde-reactice material from chemical combination with said aldehyde-unreactive material, and to essentially degrade the high molecular weight polysaccharide material to lower molecular weight material. The heat treatment may be applied to an alkaline water soluble bark extract which has been previously extracted and separated from an insoluble bark residue or may be applied simultaneously with an alkaline extraction step. The freed aldehyde-reactive phenolics may then be separated from the aldehyde-unreactive material by precipitating the aldehyde-reactive material in an insoluble form, filtering of the insoluble aldehyde-reactive material and washing it free of soluble aldehyde-unreactive material.

Other examples of bark extraction are disclosed in U.S. Pat. 2,782,241, Feb. 19, 1957, Gray et al.; 2,890,231, June 9, 1959, Heritage et al.; and 3,053,784, Sept. 1, 1962, Herrick et al. In these examples, the phenolic type resin-reactive materials can be obtained by digesting or extracting the bark of a coniferous tree in an aqueous medium at a temperature of from 17° to 185° C. with sufficient alkali hydroxide and for a sufficient time that a part of the water insoluble portion of the bark is converted to a water soluble alkali derivative thereof and alkali hydroxide equivalent to from 0.03 to 0.10 part $Na_2O$ per part of dry bark is combined with bark substance of the desired resin-reactive material, and separating the water soluble material from the residual bark.

Another manner of treating bark to obtain materials containing the required phenolic compounds is by pyrolysis of the bark (see Pulp and Paper Magazine of Canada, April 1952, Bark Pyrolysis by Fluidization Techniques," Alan H. Vroom).

The following quotations from this article are illustrative of the pyrolysis technique:

"Comminuted air dry wood barks were readily pyrolysed, at temperatures up to 275° and 460° C., by employing the fluidized bed technique with nitrogen, carbon dioxide or superheated steam as the carrier gas. The gaseous products, readily isolated when steam was used, contained principally carbon monoxide, carbon dioxide, methane and some hydrogen; the yield was approximately 2.3 cu. ft. per lb. of dry mark and its heating value about 260 B.t.u. per cu. ft. for pyrolysis at 400° C.

"The organic distillate amounted to about 20 percent and contained a complex mixture of compounds including waxes, resins, phenols and acetic acid, which might eventually serve as a source of raw materials for the chemical industry. Another important product was the 32 to 34 percent yield of a free-flowing, granular, easily pulverizable, pyrophoric charcoal with a fuel value approximately equal to that customarily obtained by burning the equivalent weight of bark in a wet condition.

"The fluidized pyrolysis appeared readily adaptable to continuous commercial operation in portable as well as large scale installations, and could be made to depend on no raw materials other than bark and water.

"At the start of an experiment, 300 to 500 grams of ground bark was fluidized, in the cold apparatus with cold nitrogen or carbon dioxide. Heat was supplied to the bed chiefly through the walls of the column and the inlet gas temperature was held just a few degrees above the bed temperature. With proper fluidization, heat transfer from the walls was rapid and the temperature throughout the bed was increased quite uniformly. In every experiment either nitrogen or carbon dioxide was used as the fluidizing medium until the bed temperature had reached about 140° C. At this point, the gas was changed to steam in those experiments where the pyrolysis in a steam atmosphere was desired, otherwise the distillation was continued with the original gas."

The bark pyrolysates employed in accordance with the invention comprise a complex mixture, 60 to 80% of which comprises phenolic compounds. These compounds may be said to have the following general structure:

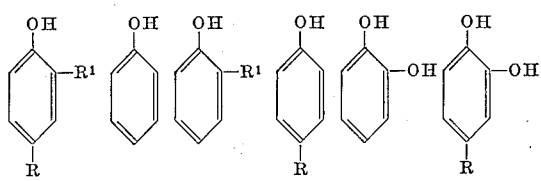

where $R^1$ represents a methoxy group or an aliphatic side chain containing from one to three carbon atoms, and R represents an aliphatic side chain containing from one to three carbon atoms or a carboxyl group. Bark extracts contain compounds similar to those contained in the pyrolysates but of higher molecular weight.

The barks from which these extracts and pyrolysates are obtained include those of the following tree species: balsam fir (*Abies balsamea*), red spruce (*Picea rubra*), white spruce (*Picea glauca*), black spruce (*Picea mariana*). However, the bark of substantially any coniferous tree may be employed, including the various fir varieties (Abies, etc.), the spruces (Picea, etc.), and the pines (Pinus, etc.).

In accordance with the invention, the resin-reactive material in the bark pyrolysate or extract is converted into an alkali metal salt. This salt may be blended with an alkali metal salt of a dihydroxyphenol. The salt (or salts) is then reacted with epichlorohydrin to form an epoxy type resin intermediate.

While in some instances, it may be desirable to react the epichlorohydrin with an aqueous alkaline solution of the alkali metal salt, it is preferred to react the epichlorohydrin with such a salt in which the moisture content is less than 5%. Such a dried salt may be prepared in the following manner, using the sodium salt or salts as examples.

Sodium salts of a bark pyrolysate or extract are produced by adding sodium hydroxide to the pyrolysate or extract until the pH value of the mixture reaches the range of 11 to 13.5, the exact pH value depending upon the resin characteristics desired. In the case of the extract, sodium may already be present so that adjustment of the pH may be all that is required.

The sodium salt of the pyrolysate or extract, or a blend of such sodium salts, is then dried to a water content of preferably less than 5% on a weight/weight basis. Alternatively, in the case of various blends, the individual salts may be prepared and dried separately and then blended in the dry state.

The solid sodium salt (or salts) is then suspended in a quantity of epichlorohydrin. The quantity of epichlorohydrin used is in excess of that stoichiometric amount required for the reaction of epichlorohydrin with the sodium present in the salts and should be sufficient to dissolve the epoxy resin and provide a stirrable mixture. The reaction between the sodium salt (or salts) and the epichlorohydrin is generally carried out under reflux conditions at a temperature corresponding to the boiling point of the reactants and solvent mixture at atmospheric pressure. The reaction can also be carried out, however, at higher temperature and pressure in an autoclave preferably in the presence of an inert gas. The reaction time is dependent on the temperature chosen and the characteristics desired for the resin intermediate. Thus, depending mainly on temperature, the reaction time (for a 90–100% conversion) can vary between several minutes and 120 minutes; the resin is not seriously affected if the time is prolonged beyond that required for nearly full conversion.

When the reaction between the epichlorohydrin and the sodium salt (or salts) has reached 90–100% completion, the sodium chloride formed is filtered from the mixture and the excess epichlorohydrin (in which the resin has dissolved) is recovered for re-use by distillation under reduced pressure. The resin intermediate is recovered from the still plot after this distillation is completed.

One advantage of the suspension technique described is the avoidance of loss of some of the resin-reactive components present in the bark pyrolysate or extract. If the reaction between the sodium salt of the pyrolysate or extract and the epichlorohydrin is allowed to take place in an aqueous medium, it has been found that many of these bark components are lost. These components are largely carboxylic acids which, in resin reactions, lead to the formation of epoxy esters. The epoxy ether and epoxy ester combination can lead, therefore, to a more useful bark resin product.

Another advantage of the suspension technique described lies in the fact that the presence of water in the resin reaction beyond a certain low amount, tends to decrease the number of epoxy groups available for cross-linking. Thus, by reducing the water content to a low and controllable amount one is able, by fixing the residual water content (in conjunction with time and temperature of the reaction), to control, for example, the viscosity of the resin intermediate.

Other advantages of the suspension technique described include lower retention or reaction times, better control of product quality, easier materials handling, and more easily attainable higher reaction temperatures.

It is also to be noted that, when the suspension technique is employed, the epichlorohydrin performs functions which are not achieved when conventional methods are used. It, for example, acts as a main medium (as to heat transfer and the like) in which the resin reaction can take place. Moreover, it acts as a solvent for the resin formed.

When it is desirable to modify the characteristics of the pyrolysate, the crude concentrated pyrolysate can be treated with acetone and concentrated hydrochloric acid; after sufficient reaction time, the excess hydrochloric acid is boiled off (and reclaimed) and the residue converted into a substantially dry sodium salt for subsequent treatment with epichlorohydrin as indicated above.

The following examples will serve to illustrate the process of the present invention. The bark pyrolysates or extracts mentioned were produced from barking drum wastes composed of approximately 50% balsam and 50% spruce bark using the pyrolysis technique such as described in the above mentioned Vroom article.

EXAMPLE I 50 grams of bark pyrolysate was dissolved in 20 grams of sodium hydroxide and 200 ml. of water. The solution heated, with stirring, to 70–75° C.; at this temperature and over a period of 20 minutes, 58 grams of epichlorohydrin was added; the temperature was maintained at 70–75° C. for an additional 20 minutes. On cooling to room temperature, the aqueous portion was decanted from the precipitated epoxy intermediate, which was then washed with water and dried. The reaction, based on the amount of sodium removed from the pyrolysate was approximately 50% complete, and the epoxy oxygen content was from 5 to 6%.

EXAMPLE II

The sodium salt of a quantity of bark pyrolysate was formed by titrating the pyrolysate with sodium hydroxide (in methanol solution) until the pH of the mixture reached 13. The salt formed was dried to a water content of approximately one percent on a weight/weight basis.

60 grams of dried sodium salt of the pyrolysate was then suspended, with stirring, in 180 ml. of epichlorohydrin. The mixture was reacted by refluxing for ninety minutes at the boiling temperature of the mixture (116–125° C.) under atmospheric pressure. The sodium chloride formed was then filtered from the solution and the solution and the excess epichlorohydrin was removed from the solution by distillation under reduced pressure leaving the epoxy intermediate as a residue.

The reaction, based on the amount of sodium removed from the pyrolysate, was 90 to 100 percent complete. The resin intermediate contained 2.5 to 3.5 percent epoxy oxygen.

EXAMPLE III

The sodium salt of bisphenol A was produced by reaction of the bisphenol A with sodium hydroxide in methanol solution. The resulting bisphenolate A was dried to a water content of about 1 percent on a weight/weight basis.

60 grams of sodium bisphenolate A was suspended with stirring in 180 millilitres of epichlorohydrin. The resulting mixture was reacted by refluxing, at the boiling temperature of the mixture under atmospheric pressure, for 90 minutes. The sodium chloride formed in the reaction was then filtered from the solution. The excess epichlorohydrin was removed from the solution by distillation under reduced pressure. The reaction based on the sodium removed from the bisphenolate A was 90 to 100 percent completed. The resin intermediate produced contained 8.0 to 8.5 percent epoxy oxygen.

EXAMPLE IV

The sodium salt of a quantity of bark pyrolysate was formed as described under Example II above. The sodium salt of bisphenol A was formed as described under Example III.

42 grams of the dried sodium salt of bark pyrolysate was mixed with 18 grams of dried sodium bisphenolate A. The mixed sodium salts were suspended, with stirring, in 180 ml. of epichlorohydrin. The resulting mixture was reacted by refluxing at the boiling temperature of the mixture under atmospheric pressure for 90 minutes. The sodium chloride formed in the reaction was then filtered from the solution. The excess epichlorohydrin was removed from the solution by distillation under reduced pressure. The reaction, based on the amount of sodium removed from the salts, was 90 to 100 percent completed. The resin intermediate produced contains 3.5 to 4.5 percent epoxy oxygen.

EXAMPLE V 60 grams of dried sodium bisphenolate A was suspended, with stirring, in 180 ml. of epichlorohydrin. The resulting mixture was reacted at 130° C. in a nitrogen atmosphere in an autoclave for 50 minutes. The sodium chloride formed in the reaction was filtered from the solution. The excess epichlorohydrin was removed from the solution by distillation under reduced pressure. The reaction, based on the sodium removed from the bisphenolate A, was 85 to 95 percent completed. The resin intermediate produced contains 7.8 to 8.5 percent epoxy oxygen.

EXAMPLE VI

The sodium salt of bark pyrolysate was prepared and reacted with epichlorohydrin as described in Example II above. By controlling the drying of the salt, various moisture levels were attained. The reaction time in all cases was for 2 hours under reflux conditions (and atmospheric pressure). The results of these experiments are shown in the following table:

| Experiment | Percent moisture of the Na-salt | Percent epoxy oxygen | Degree of completion percent |
|---|---|---|---|
| 6A | 2.28 | 3.0 | 90 |
| 6B | 1.42 | 3.2 | 90 |
| 6C | 0.86 | 3.8 | 90 |

EXAMPLE VII

In some of the above examples, the sodium salt of the bark pyrolysate was reacted with the epichlorohydrin for periods longer than were perhaps necessary. At a given temperature, the quality, etc., of the resin intermediate can be varied to some extent by varying the reaction time. In the following table, the data from two experiments are given in which the reaction time of one was four times the other. The procedure involved was similar to that of Example II above. The water content of the sodium salt was 2.3%.

| Experiment | Reaction time, min. | Percent epoxy oxygen | Degree of completion, percent |
|---|---|---|---|
| 7A | 120 | 3.0 | 90 |
| 7B | 30 | 4.3 | 90 |

EXAMPLE VIII

The pH of a quantity of bark extract, prepared in accordance with the technique described in said copending application, which was already in the sodium form, was adjusted to 13. The salt was then dried to a water content of approximately two percent.

60 grams of the dried sodium salt of the extract was then suspended, with stirring, in 180 ml. of epichlorohydrin and refluxed for 120 minutes under atmospheric pressure. The sodium chloride formed was then filtered from the solution and the excess epichlorohydrin was removed by distillation leaving the epoxy intermediate as a residue.

The reaction, based on the amount of sodium removed from the extract, was approximately 90% complete. The epoxy oxygen content was approximately 2.5%.

Examples I, II, III and IV may be conducted using potassium or lithium hydroxide to form the corresponding salts.

The expression "material obtained from coniferous tree bark" as employed in the appended claims is intended to mean a bark extract or bark pyrolysate prepared as described herein and containing the dihydroxyphenols set forth.

I claim:
1. A method of preparing an epoxy resin intermediate which comprises adding an alkali metal hydroxide to a mixture of dihydroxy phenols obtained from coniferous tree bark in sufficient quantity to adjust the pH thereof to at least about 11 to convert said phenols into the alkali metal salts thereof, drying said alkali metal salts to a moisture content of 0.86% to 5%, suspending said solid dried salts in a quantity of epichlorohydrin in excess of the stoichiometric amount required for reaction thereof with the alkali metal present in said material, heating the resulting mixture to cause reaction of said salts and epichlorohydrin, and recovering an epoxy resin intermediate from the reaction mixture.

2. A method of preparing an epoxy resin intermediate as defined in claim 1, wherein said mixture of dihydroxy phenols comprises a bark pyrolysate.

3. A method of preparing an epoxy resin intermediate as defined in claim 1, wherein said mixture of dihydroxy phenols comprises a bark extract.

4. A method of preparing an epoxy resin intermediate as defined in claim 1, wherein said alkali metal hydroxide selected from the group consisting of the hydroxides of sodium, potassium and lithium.

5. A method of preparing an epoxy resin intermediate as defined in claim 1, wherein said pH is adjusted to within the range of about 11 to about 13.5.

6. A method of preparing an epoxy resin intermediate which comprises adding an alkali metal hydroxide to a mixture of dihydroxy phenols obtained from coniferous tree bark in sufficient quantity to adjust the pH thereof to at least 11 to convert said phenols into the alkali metal salts thereof, blending with said alkali metal salts a minor quantity of an alkali metal salt of a single dihydroxy phenol, drying said blended salts to a moisture content of 0.86% to 5%, suspending said solid dried salts in a quantity of epichlorohydrin in excess of the stoichiometric amount required for reaction thereof with the alkali metal present in said material, heating the resulting mixture to cause reaction of said salts and epichlorohydrin, and recovering an epoxy resin intermediate from the reaction mixture.

References Cited

UNITED STATES PATENTS

| | | | |
|---|---|---|---|
| 2,181,100 | 11/1939 | Slaugh et al. | 260—348 |
| 2,252,039 | 8/1941 | Schirm | 260—348 |
| 2,371,500 | 3/1945 | Britton et al. | 260—348 |
| 2,739,160 | 3/1956 | Bell et al. | 260—348 |
| 3,053,784 | 9/1962 | Herrick et al. | 260—29.3 |

NORMA S. MILESTONE, Primary Examiner

U.S. Cl. X.R.

260—47